US005629073A

United States Patent [19]

Lovell

[11] Patent Number: 5,629,073

[45] Date of Patent: May 13, 1997

[54] MEDIUM TEMPERATURE CONDUCTIVE-RESISTANT ARTICLES AND METHOD OF MAKING

[75] Inventor: Walter C. Lovell, Wilbraham, Mass.

[73] Assignee: Tapeswitch Corporation, Farmingdale, N.Y.

[21] Appl. No.: 479,340

[22] Filed: Jun. 7, 1995

Related U.S. Application Data

[60] Division of Ser. No. 117,916, Sep. 7, 1993, Pat. No. 5,494, 610, which is a continuation-in-part of Ser. No. 905,764, Jun. 29, 1992, abandoned.

[51] Int. Cl.⁶ .......... B32B 3/00

[52] U.S. Cl. .......... 428/206; 428/201; 428/209; 338/211; 427/385.5; 427/389.9; 442/117; 442/392; 442/72

[58] Field of Search .......... 428/246, 262, 428/201, 206, 209, 244, 283, 285, 286, 290; 338/211; 427/385.5, 389.9

[56] References Cited

U.S. PATENT DOCUMENTS

| | | | |
|---|---|---|---|
| 3,248,237 | 4/1966 | Weldes et al. | 106/38.35 |
| 3,518,116 | 6/1970 | Stock et al. | 117/226 |
| 3,696,054 | 10/1972 | Saunders | 252/511 |
| 4,656,339 | 4/1987 | Grise | 219/528 |
| 4,664,900 | 5/1987 | Miyazaki et al. | 423/447.3 |
| 4,810,600 | 3/1989 | Priard et al. | 429/224 |
| 4,877,544 | 10/1989 | Gabriel et al. | 252/99 |
| 5,085,803 | 2/1992 | Wakita et al. | 252/511 |

*Primary Examiner*—Christopher Raimund
*Attorney, Agent, or Firm*—Hoffmann & Baron

[57] ABSTRACT

A medium temperature conductive-resistive article employing graphite suspended in a high temperature polymer based activator and water is disclosed. The conductive-resistive substance can be applied to a fabric-like substrate in order to provide an electrical resistive temperature adjustable heating element which can alter the temperature of the fabric-like substrate when electrical current is permitted to flow through the conductive-resistive substance. A process of making the article is also disclosed.

21 Claims, 4 Drawing Sheets

MEDIUM TEMPERATURE CONDUCTIVE-RESISTANT ARTICLES AND METHOD OF MAKING

This is a divisional of application Ser. No. 08/117,916 filed on Sep. 7, 1993, now U.S. Pat. No. 5,494,610, which is a continuation-in-part of U.S. patent application Ser. No. 07/905,764 filed Jun. 29, 1992, now abandoned.

BACKGROUND OF THE INVENTION

The present invention relates to temperature-producing conductive-resistive medium and to a method of producing a variety of articles therefrom.

There have been many attempts to produce electrically-conductive coatings such as paints. Generally, there are two types of electrically-conductive coatings. The first is a low resistivity, high conductivity paint that contains a pigmentation of metal particles while the second is a high resistivity, low conductivity paint that is formed from compositions containing carbon or graphite.

Low resistivity paints have traditionally been used to provide coatings having a high conductivity for connecting conductors that require a superior electrical bond with a minimum resistance. Generally, low resistivity paints cannot be applied to materials in order to produce temperature adjustable heating elements because the low resistivity paint requires a high volume of current to generate a reasonable output of heat. In contrast, the resistivity of traditional highly resistive paints is often so high that a relatively high voltage drop is required in order to generate sufficient heat. As a result, the use of high resistivity paints usually sacrifices safety. Furthermore, when either of the above-identified traditional conductive paints are applied to various substrates, cracks and flaking of the paint often develop over a period of time. This causes a breakdown in the temperature adjustable property of the article.

It is therefore an object of the present invention to provide a method and apparatus for generating an electrical resistance temperature adjustable substance for application to a variety of substrates in order to provide temperature controllable properties.

It is another object of the present invention to provide a method and apparatus for generating an electrical resistance temperature adjustable substance for application to a variety of materials wherein the electrical resistance temperature adjustable substance does not inhibit the inherent flexibility of the substrate to which it is applied.

Other and further objects will be made known to the artisan as a result of the present disclosure and it is intended to include all such objects which are realized as a result of the disclosed invention.

SUMMARY OF THE INVENTION

In accordance with one embodiment of the present invention, a medium temperature conductive-resistive coating composition for proving temperature adjustment capability to a substrate includes the following components based on 100 weight percent total composition: 10–30 weight percent graphite, 20–65 weight percent of a high temperature polymer latex and 6–60 weight percent water. The medium temperature conductive-resistive coating composition may be referred to herein as medium temperature conductive-resistant (MTCR) paint. "Medium temperature", as used in the present application, refers to temperatures ranging from ambient to about 400° F. The polymer latex may be derived from a high temperature polymer based activator. The graphite and high temperature polymer based activator are preferably combined with 22–32 weight percent of water derived from an initially prepared graphite slurry.

The conductive-resistive coating composition can be applied to a fabric-like substrate to provide an electrical-resistant temperature-adjustable substance which acts as a heating element capable of producing temperatures varying between ambient temperature and an elevated temperature. In order for the electrical-resistant temperature-adjustable heating element to vary its temperature, an electric current is imposed on the coated substrate such as by spaced apart electrical conductors secured to the fabric. As a result, the conductive-resistive coating applied to the fabric-like substrate provides an electrical path between the conductors so that the conductive-resistive substance radiates heat.

The method of the present invention for providing temperature-adjustment capability to a variety of materials includes applying a conductive-resistive substance to a fabric-like substrate and imposing an electrical current across the coated substrate. The method may also include applying a hydrophilic substance to the fabric-like substrate before the conductive-resistive substance is applied.

The composition and method of the present invention provides a medium temperature conductive-resistive substance which does not crack or flake after repeated heating and cooling of the article. Additionally, the composition of the present invention provides a medium temperature conductive-resistive substance which will not inhibit the inherent flexibility of the article to which it is applied. Moreover, the medium temperature conductive-resistant article of the present invention provides a fabric-like substrate which can be heated to relatively high temperatures without the danger of combustion.

A preferred form of the apparatus and method for providing medium temperature conductive-resistive articles, as well as other embodiments, objects, features and advantages of this invention will be apparent from the following detailed description of illustrative embodiments thereof, which is to be read in connection with the accompanying drawings.

DETAILED DESCRIPTION OF THE PREFERRED EMBODIMENTS

According to the present invention, a conductive-resistive coating composition comprising conductive powder suspended in a polymer based activator and water can be applied and lastingly adhered to a variety of substrates without inhibiting the inherent pliability of the substrate.

Figure 1:
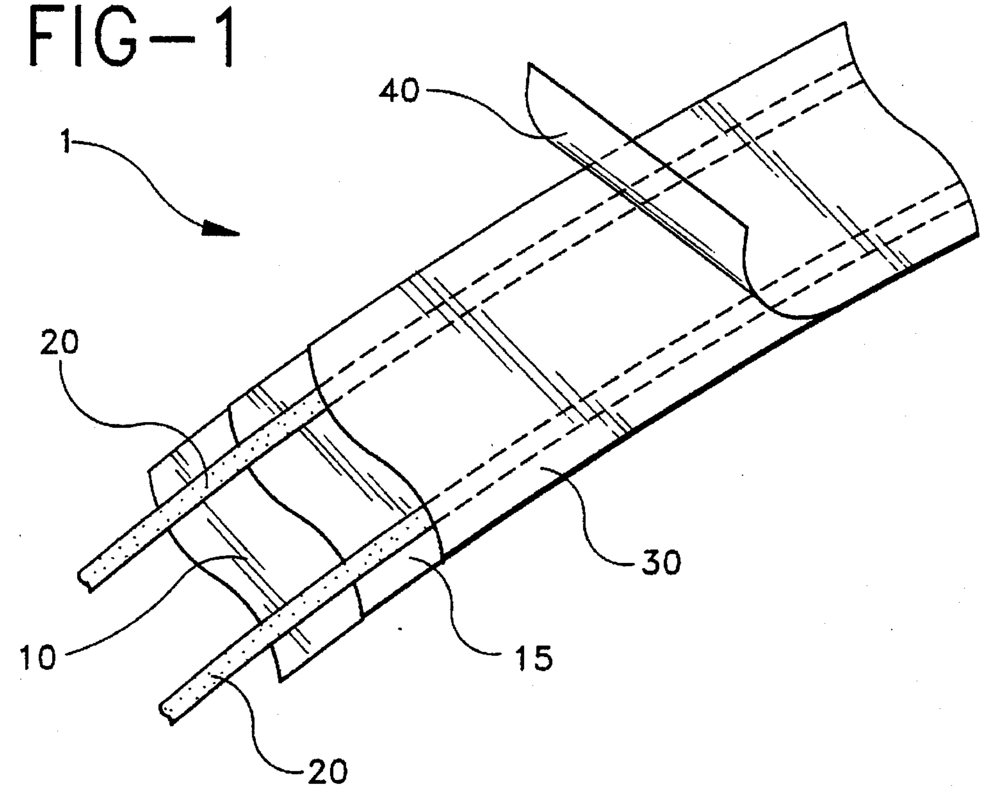
FIG. 1 is a top perspective view of one embodiment of the present invention.

Referring now to FIG. 1 of the drawings, a medium temperature conductive-resistant (MTCR) article 1 is shown. "Medium temperature", as used in the present application, refers to temperatures ranging from ambient to about 400° F. The MTCR article includes a substrate 10. The substrate can be any one of a variety of pliable and fabric-like textile products including those intended for use as garments, wall coverings, floor coverings or the like. Examples of pliable materials include MYLAR® film, polyester and cotton. In addition, any one of a variety of non-pliable materials can be utilized including, but not limited to, ceramic, cement and plasterboard.

In the embodiment depicted in FIG. 1, conductive strips 20 in the form of spaced-apart electrical conductors are attached to the fabric-like substrate 10. Strips of copper foil as well as many other types of conductive materials can be utilized as electrical conductors. The electrical conductors are preferably formed in the shape of relatively thin strips in order to avoid inhibiting the inherent flexibility of the substrate. In addition, the conductors are preferably spaced between four and six inches apart. The electrical conductors can be secured to substrate 10 in any manner deemed appropriate to a person skilled in the art. However, silicon, acrylic and polyester heat melt adhesives have been demonstrated as being capable of adequately securing the thin strips of copper foil to a polyester fabric substrate. Acrylic adhesives have been demonstrated as being capable of working when the operating temperature remains below 180° F. However, for operating temperatures above 180° F. but below 300° F., silicon-based adhesives have been demonstrated as providing the best adhesion without thermal breakdown.

Once the conductive strips 20 have been secured to the substrate 10, medium temperature conductive-resistant (MTCR) paint 30 which is the conductive-resistive composition of the invention is applied to the surface of the substrate and to the spaced-apart conductive strips which have been adhered thereto. The electrical conductors are spaced in order to provide a sufficient length of the MTCR paint to generate and radiate heat when a voltage source is applied.

The MTCR paint can be applied by any of the known means of application such as by brush or power sprayer. A relatively thin, even coating preferably about 4–10 MILS thick of the MTCR paint is preferably applied to the substrate-electrical conductor combination, although thicker coatings may also work. However, thicker coatings are usually less desirable because they have a tendency to take a longer period of time to dry and are usually less flexible. The paint can be permitted to dry naturally or the drying process can be accelerated by heating and air circulation devices. The MTCR paint is capable of safely heating to approximately 400° F. before experiencing deleterious effects.

In order for the MTCR article shown in FIG. 1 to outwardly exhibit a fabric-like appearance, a second substrate 40, preferably having fabric-like pliability and a substantially similar shape to that of the first substrate 10, can be laid upon the portion of the fabric-like first substrate 10 that has the spaced-apart electrical conductors 20 and MTCR paint 30 applied thereto. The fabric-like second substrate is preferably secured to the fabric-like first substrate once the MTCR paint has dried. The fabric-like second substrate is preferably attached to the MTCR paint using an acrylic silicon or a polyester heat melt adhesive, depending upon the anticipated operating temperature of the article. After the fabric-like second substrate has been adhered to the MTCR paint, the MTCR article 1 preferably will outwardly appear substantially similar to a length of fabric which does not have a layer of MTCR paint in combination with spaced-apart electrical conductors.

Figure 2:
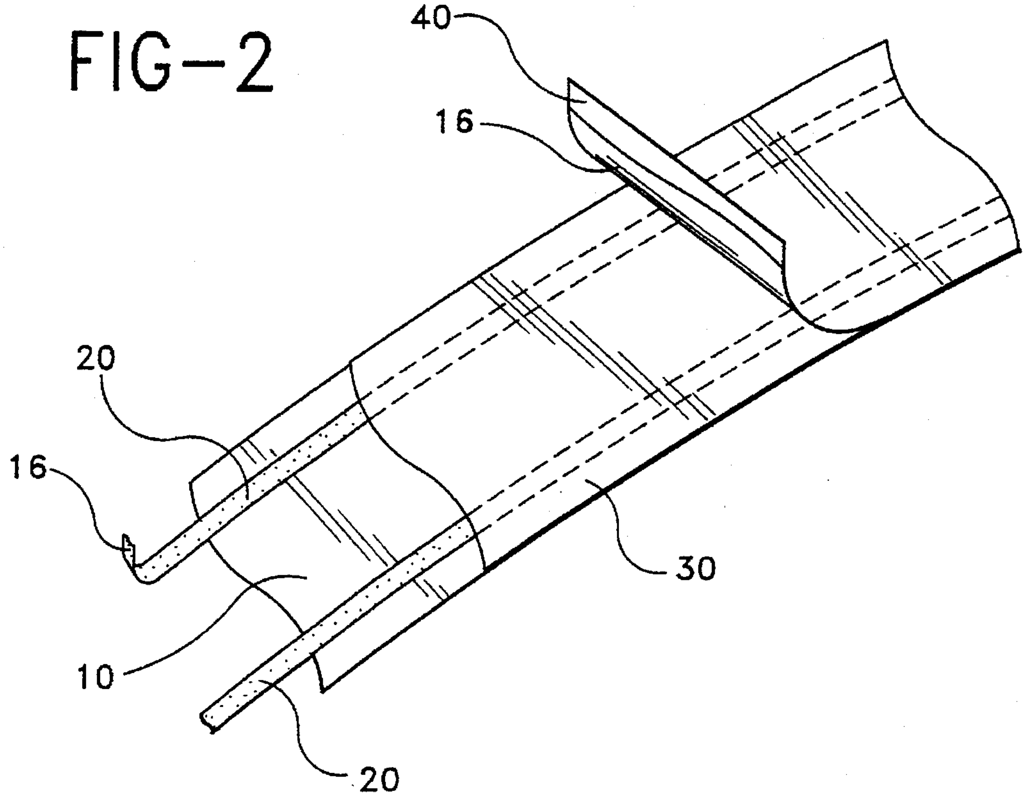
FIG. 2 is a top perspective view of a second embodiment of the present invention.

An alternative embodiment is shown in FIG. 2 wherein a polyester heat melt adhesive 16 is applied to the bottom of each conductive strip 20 so that the strip can be secured to the fabric-like substrate 10. Thereafter, the MTCR paint 30 is applied to the combination of the conductive strips and fabric-like substrate. A coating of the polyester heat melt adhesive is applied to the underside of the second substrate 40 so the second substrate can be secured to the layer of MTCR paint.

Figure 3:
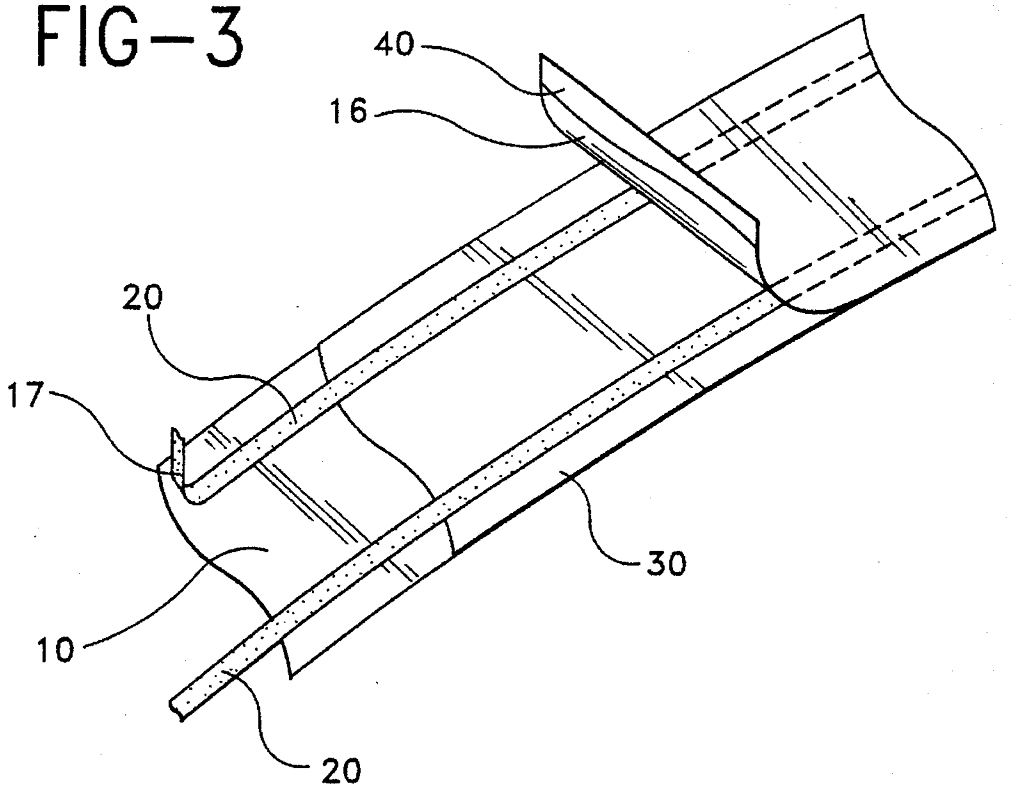
FIG. 3 is a top perspective view of a third embodiment of the present invention.

Another embodiment is illustrated in FIG. 3 wherein a layer of MTCR paint 30 is applied to the fabric-like substrate 10 and allowed to dry. Then, conductive adhesive 17 is applied to the underside of the conductive strips 20 before the conductive strips are laid upon MTCR paint. The second substrate 40 is then secured to the combination of first substrate, conductive strips and MTCR paint as described with regard to FIG. 2.

Figure 4:
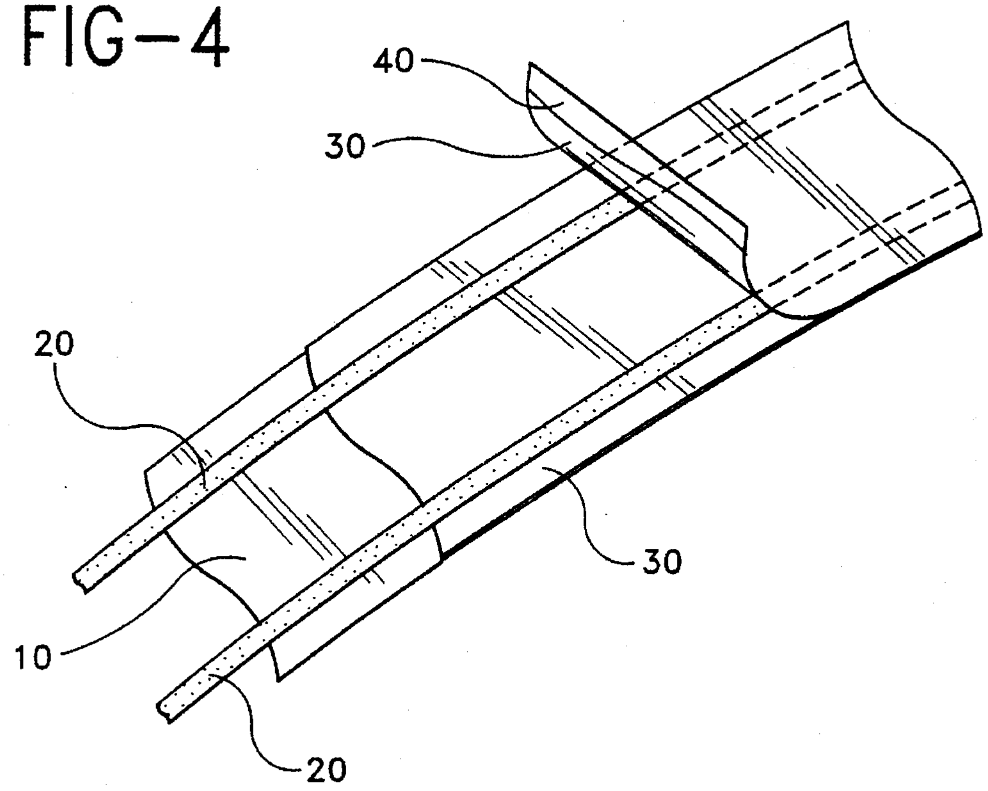
FIG. 4 is a top perspective view of a fourth embodiment of the present invention.

An alternative embodiment of the present invention is shown in FIG. 4 wherein MTCR paint 30 is applied directly to the fabric-like substrate 10. The conductive strips 20 are laid upon the MTCR paint before the MTCR paint has dried so that when the paint dries, the conductive strips will be secured to the substrate. Thereafter, MTCR paint is applied to the underside of the second substrate 40. Before the MTCR paint has dried, the portion of the second substrate that has the MTCR paint is laid upon the side of fabric-like substrate 10 having the conductive strips and MTCR paint applied thereto.

Figure 5:
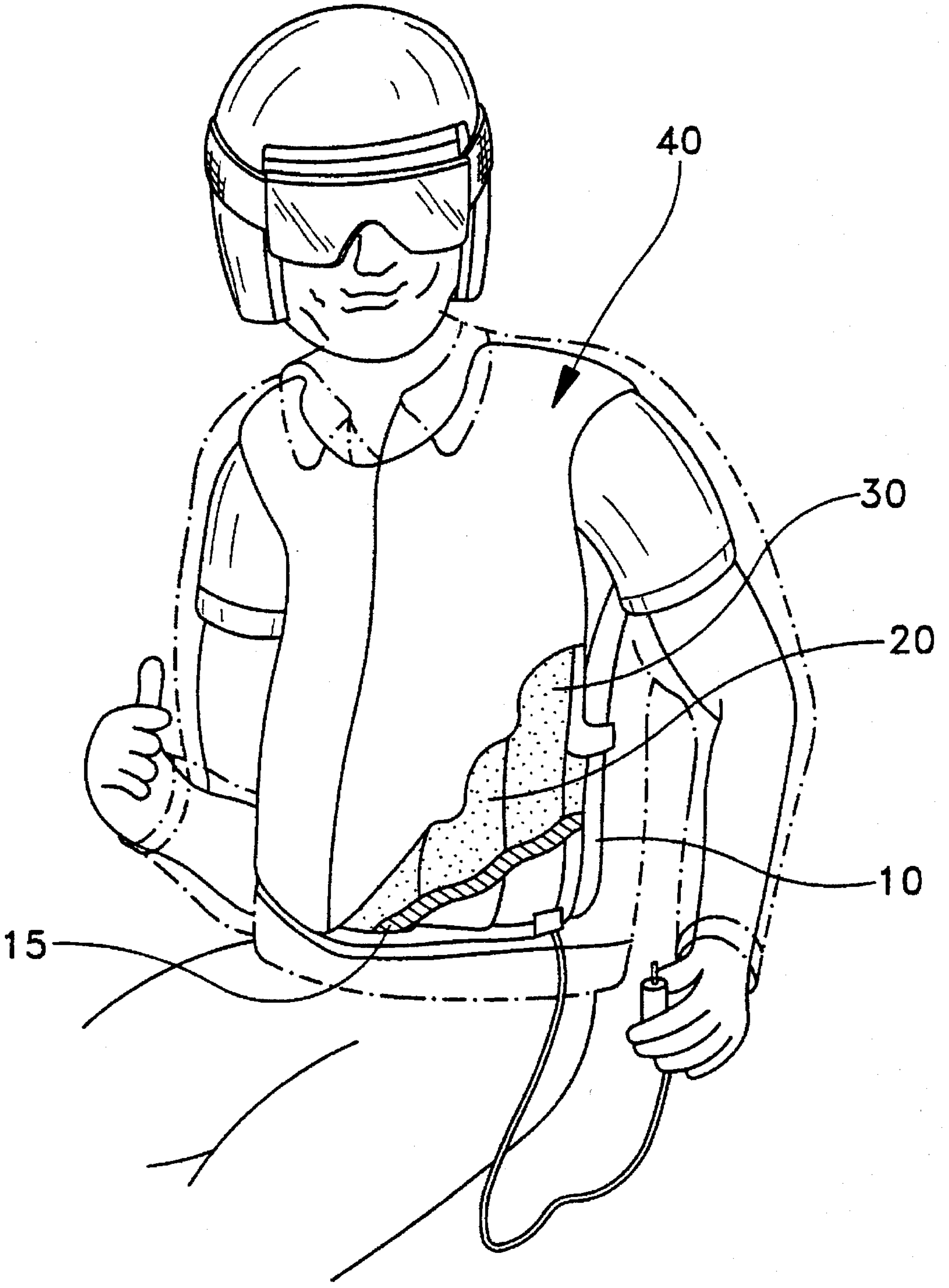
FIG. 5 is a perspective view of one implementation of the device of the present invention.

The method of the present invention enables the artisan to select a fabric-like article of any desired shape. For example, a MTCR article can be a vest worn by snowmobilers or the like as shown in FIG. 5, or it can be a substrate which will take on the shape of any other article or a smaller portion of the vest. The substrate is preferably hydrophilic in nature, however, non-hydrophilic materials may also be used. If the substrate is non-hydrophilic, the substrate may be treated with a hydrophilic substance 15, e.g., polyvinylpyrrolidone (PVP). The hydrophilic substance is applied to the non-hydrophilic substrate so that the substrate will have an affinity for water and water-base products which are applied thereto. Since the MTCR paint has a water-base, it is preferable that the substrate be hydrophilic in nature or that the hydrophilic substance be applied.

Figure 6:
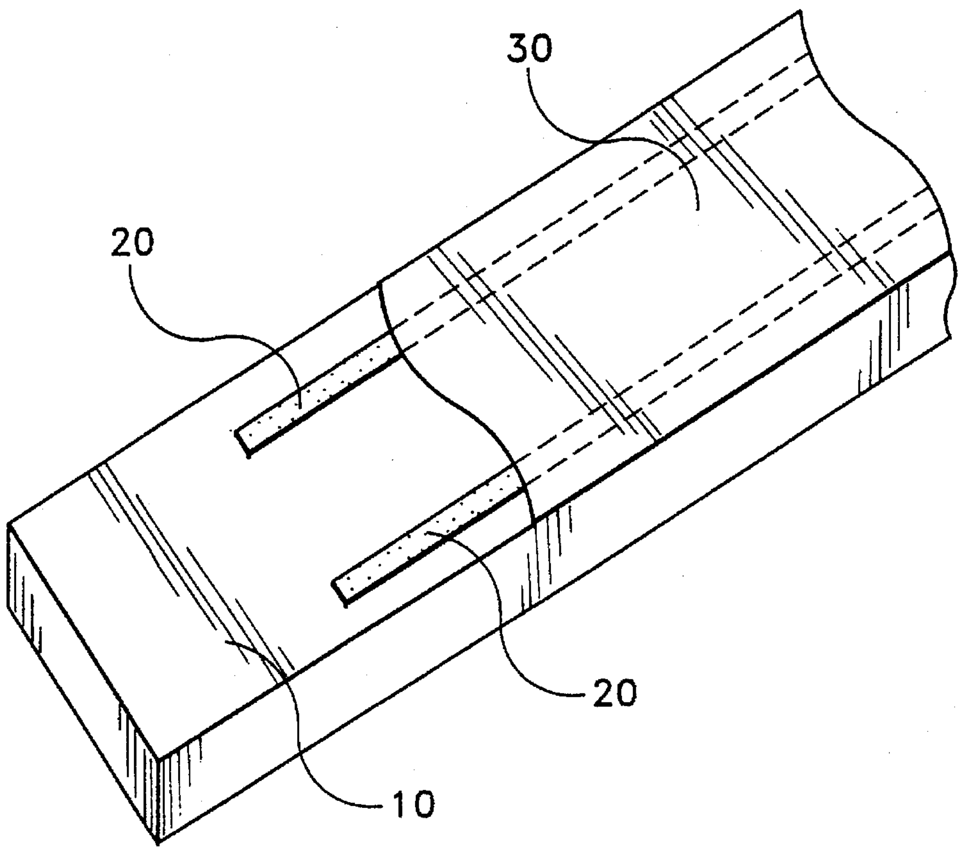
FIG. 6 is a perspective view of a second implementation of the device of the present invention.

As previously stated and as shown in FIG. 6, the MTCR paint can be applied to a variety of non-pliable materials. Referring to FIG. 6, a MTCR article 1 is shown wherein the substrate 10 is a section of inflexible ceramic floor tile. Attached to the ceramic floor tile are spaced-apart electrical conductors 20. Since the substrate is non-pliable, it is not necessary to employ thin, flexible electrical conductors and therefore thicker, rigid conductor strips can be implemented. The conductors can be secured to the ceramic tile using any known means. Thereafter, MTCR paint 30 is applied to the surface of the substrate and to the conductors which have been applied thereto. It should be noted that the present invention will operate without having the electrical conductors secured to the substrate. However, in order to be able to radiate sufficient amounts of heat and in order to produce wide temperature ranges, it is preferred to secure strips of spaced-apart electrical conductors as previously described.

The MTCR paint used in the present invention is capable of heating to relatively high temperatures, approximately 400° F., without combustion of the substrate. The MTCR paint includes between 10 and 30, preferably between 15 and 25 weight percent of graphite. A suitable and preferred form of graphite for use in this paint is P38-2% ash-200 mesh graphite manufactured by UCAR Carbon Co. of Parma, Ohio. However, other graphites that are substantially equivalent to that of the P38-2% ash graphite may also be used. The preferred particle size of the graphite is about 150 to about 325 mesh.

The MTCR paint further includes a graphite slurry of between 22 and 32 weight percent water mixed with the graphite. Then between 48 and 58 weight percent of a high temperature, polymer-based activator is combined with the graphite slurry.

The polymer based activator is a polymer latex emulsion in water and is commercially available as latex paint which can be used for purposes of convenience. The latex paint useful herein may be generally described as an emulsion composed of a water-based resin dispersion. Other optional additives may be present in the commercial preparations including, for example, colorants, fillers and extenders. Latex paint and methods for its manufacture are known in the art.

Synthetic latexes are made by mixing the organic monomer with water and surfactant to form an emulsion of tiny monomer droplets surrounded by the surfactant soap or detergent such as sodium dodecylsulfate. When a polymerization catalyst, e.g., a free radical catalyst such as peroxide or organo-metallic compound such as butyl lithium, is added to the emulsion, it migrates into the droplet and polymerization takes place. Cross linking may also occur. The resulting aqueous dispersion of polymer is called a latex. The particle size ranges from about 0.05–0.25 micron; thus these are colloidal suspensions. These latex polymers include acrylate resins; polyvinyl resins, styrene-butadiene copolymers and similar materials.

Acrylate resins are mono- or co- polymers of acrylic acid ($H_2C{=}CHCOOH$) and its analogues. Acrylic latexes tend to be alkaline and may be composed of monomers such as methyl methacrylate, butyl methacrylate, methyl acrylate, ethyl acrylate, butyl acrylate and 2-ethylhexylacrylate. Additional monomers such as styrene, vinyl acetate, vinylidene chloride or acrylonitride can be polymerized with acrylic monomers. Thermosetting acrylic resins may also include monomers of acrylonitrile, acrylamide, styrene and vinyl toluene. The primary acrylic emulsions in the art are made by polymerization or copolymerization of acrylic acid, methacrylic acid, acrylonitryle and esterification of them. The properties of the acrylic polymers depend to a large degree on the type of alcohol from which the esters are prepared. Normally alcohols of lower molecular weight produce harder polymers. The acrylates are generally softer than the methacrylates. The acrylics are the most stable of the emulsion polymers and require a minimum of stabilizes as protective colloids, dispersing agents and thickeners. Vinyl acrylic is the arcylic latex most commonly used herein.

Polyvinyl resins include polyvinyl chloride, polyvinyl acetate, polyvinylidene chloride, polyvinyl alcohol, polyvinyl acetals, polyvinyl ethers, polyvinylpyrrolidone, polyvinyl fluoride and polyvinylcarbazole. Particularly useful herein are vinyl polymer latexes of vinyl acrylic as discussed above, also vinyl acetate which has the monomer $H_2C{=}CHOOCCH_3$ and vinylidene chloride which has the monomer $H_2C{=}CHCl$. Vinyl acetate is frequently polymerized with a comonomer of ethylene or vinyl chloride. Polyvinyl acetate is commonly used as the latex herein and it may also be copolymerized with a plasticizer such as dibutyl maleate, or may be combined with a chemical plasticizer such as dibutyl phthalate.

Styrene-butadiene is obtained by emulsion polymerization of butadiene monomer which has the formula $H_2C{=}CH{-}CH{=}CH_2$, and styrene monomer which has the formula $C_6H_5{-}CH{=}CH_2$. The solids content of the latexes can range from 50% to 65–70%. The ratio of styrene to butadiene may vary widely. Incorporation of small amounts of acid monomer or plasticizer is sometimes used.

A large variety of surfactants may be used in latex paints, including polymeric carboxylates in the form of their sodium or ammonium salts and polymeric phosphates, sulfonates or a combination of surfactants. An example is sodium lauryl sulfate. The same surfactants used for polymerization stabilize the particles for further blending with other additives.

Dry ingredients are often present in latex paints in small amount or in amounts up to about 30 or even 50 wt. % and may include pigments such as titanium dioxide (rutile), zinc oxide; extenders such as calcined clay and deaminated clay, mica, calcium carbonate, talc, silica and wollastonite; thickeners and protective colloids, (usually 1% or less) such as cellulosics, notably hydroxycellulose and methyl cellulose, soluble polyacrylics, polyacrylamide, polyvinyl alcohol, starches, natural gums, and inorganic colloidal materials.

The latex paints may also include a small amount of preservatives, (e.g., 0.01%–0.05%) such as phenolic, mercuric, arsenic or copper compounds, formaldehyde, and guaternary chlorinated compounds. Preservatives include, for example, phenylmercuric compounds, alkyl mercury compounds, tributylin oxide, chlorinated phenols, barium metaborate and 1-(3-chloroallyl)-3, 5, 7-triaza-1-azonia-adamantine chloride.

Fire retardant may also be added to latex paint in minor amounts, e.g., about one % up to 25% by weight. The term fire retarding is used to describe reducing basic flammability by some modification as measured by an accepted test method (Bureau of Standards). A fire-retardant chemical denotes a compound or mixture of compounds that when added to, or incorporated chemically, into a polymer serves to slow or hinder the ignition or growth of fire.

Fire retardants include antimony oxide (antimony trioxide), antimony pentoxide, sodium antimonate, zinc borate, aluminum trihydrate, decabromodiphenyl oxide (DBDPO), chlorendic acid, tetrabromophthalic anhydride, pentabromochlorocyclohexane (PBCCH), hexabromocyclodecane (HBCD), 2,3,4,5,6-pentabromoethylbenzene (PBEB) and 1,2 bis (2,4,5-tribromophenoxy) ethane (BTBPE), halogen-containing monomer, e.g., vinyl for use in vinyl polymers such as polyacrylates, and 2 chloroethanol phosphate (3:1) (tris (2-chloroethyl phosphate). Preferred fire retardants are ammonium phosphate, antimony trioxide, boric acid and decabromodiphenyloxide.

Defoaming and antifoaming agents such as silicone are also often incorporated in small amounts, e.g., up to 0.5% by volume.

Glycols such as ethylene, diethylene, propylene, and diproplylene glycol may also be added to act as freeze—thaw stabilizers and increase open time of wet films to prevent too rapid drying which may cause an uneven coating.

Coalescents or plasticizers such as ethers or mixed ester-ethers of ethylene glycol may be added in minor amounts up to 40 lbs/100 gal. to optimize coalescence of latex particles in a coating particularly with polyvinyl acetate. Some coalescents are butyl glycol, tributyl phosphate, and pine oil, or other solvents. Toluene or xylene may also be added.

The percentage composition in latex paints is not critical, and may include, for example, about 20–30 and even up to 80 weight percent latex; about 5 to about 50 weight percent dry ingredients generally about 20 to 30 weight percent dry ingredients; and about 20–30 weight percent water but as little as 5 weight percent water or as much as 70 weight percent water plus stabilizers.

Polyvinyl acetate latexes are usually acidic, in the range of 4.5 to 8.5. The pH can be adjusted to 8.0 to 8.5 with ammonia, but the system will drift back to the acid range. Acrylic latexes and butadiene-stryrene latexes are stable in alkaline systems, e.g., adjusted to about pH 9.0–9.5 with aqueous ammonia or other amines such as ethanol-amines.

Latex paints are commercially available and include for example, X-676 Latex (B.F. Goodrich Co., Cleveland, Ohio) and X-871 Latex also referred to as XP-22 (Camger Co., Norfolk, Mass.). Numerous other latex paints are commercially available and can be used herein.

X-676 Latex (B.F. Goodrich) includes vinyl acrylic latex. The vinyl acrylic latex is an acid catalyzed vinylidine chloro-butyl acrylate copolymer with approximately a 40:60 ratio of vinylidine chloride to butyl acrylate. This latex by itself (50% solids) is sold under the trade name GEON (460X46, B.F. Goodrich Co.). Geon 460x46 has a glass transition temperature of about 17 tg and a pH of about 5. An optional acid component functions as a catalyst to make the polymer composition heat reactive for curing purposes. A significant degree of cure is effected at drying temperatures in the range of 250° F. The X-676 composition contains about 71 wt. % of vinyl acrylic latex, about 11% water, about 17% of fire retardant components (11% deca bromodiphenyloxide and 6% antimony compound as antimony oxide), about 0.3% ammonia for pH adjustment, about 0.5% carbon black for color, about 0.1% surfactants (e.g., lauryl sulfate or the like) and about 0.1% defoamers which can be dispersion-type defoamers or water-based defoamers as are known in the art for controlling excessive foaming during mixing. The X-676 Latex has about 67% solids and 37% water, a pH of about 7.6 and a viscosity of about 600 centipoises (cps) viscosity.

X-871 includes about 42.4 wt. % vinyl acetate polymer, about 4.6 wt. % xylene or toluene, about 1% boric acid and about 53% water.

The important component of the polymer based activator is the emulsion polymer which acts as a binder for the graphite. The other components of the polymer based activator are not critical to the invention and need be present only to the extent as is necessary to maintain the integrity of the polymer latex such as surfactants, protective colloids, and preservatives; or to facilitate preparation and application such as defoaming agents and antifoaming agents, coalescents or plasticizers, stabilizers and water.

The MTCR paint composition according to the present invention may include the following based on the total composition (100 wt. %): about 10 to about 30 wt. % graphite, preferably about 15 to about 25 wt. % graphite; about 20 to about 65 wt. % polymer latex; preferably about 25 to about 50 wt. % polymer latex; and about 6 to about 60 wt. % water, preferably about 20 to about 40 wt. % water. The composition may optionally include up to about 25 wt. % fire retardant.

EXAMPLES

The following synthetic latexes or copolymers were tested in the composition of the invention and found to result in coatings with inefficient resistance as compared with coatings using vinyl acrylic and vinyl acetate: carboxy modified butadiene styrene, vinyl chloride, ethylene butadiene, styrene butadiene. Therefore, the preferred polymers for the polymer based activator are acrylics such as vinyl acrylic, and vinyl acetates.

Example 1

Using commercially available 200 mesh graphite P38 powder with 2% ash, X-871 Fire Retardant Activator (high temperature polymer-based activator) and water, a medium temperature conductive-resistive (MTCR) paint was prepared in the following manner. Graphite powder (P38) in the amount of 20 weight percent (150 parts by weight) was mixed with 27 weight percent of water (200 parts by weight) to form a graphite slurry. Then 53 weight percent of X-871 Fire Retardant Activator (400 parts by weight) was mixed with the water-graphite mixture. The final composition included the following derived from the high-temperature polymer-based activator X-871: 32 wt. % vinyl acetate copolymer (slurried in 14 wt. % $H_2O$), 6 wt. % toluene, one wt. % boric acid fire retardant; plus 20 wt. % graphite (in 27 wt. % $H_2O$) from the graphite slurry. The total water was 41 wt. % from both the activator solution and graphite slurry. The viscosity was 300 cps.

The MTCR paint was applied to polyester strips having conductive strips attached thereto in accordance with the previously described method. Then MTCR strips (2"×7½") were attached to a 112 $in^2$ aluminum pan with silicon adhesive tape. The conductive metal strips of the MTCR articles were connected to a 120 volt AC power source. After 10 minutes, the MTCR strips attained a temperature of 190° F. and the water in the pan was heated to 160° F. The water temperature was maintained without a thermostat.

Thus, a constant even heat was generated by easy application of heating tape prepared in accordance with the present invention.

Example 2

Using commercially available 200 mesh graphite P38 powder with 2% ash and X-676 Fire Retardant Latex, a medium temperature conductive-resistive paint was prepared in the following manner. Graphite powder in the amount of 20 weight percent (150 parts by weight) was slurried with 27 wt. % water and the slurry was mixed with 53 weight percent of X-676 Fire Retardant Latex (600 parts by weight). The final composition included 39 wt. % vinyl acrylic latex (in 6 wt. % $H_2O$), 6% decabromodiphenol oxide and 2% antimony trioxide fire retardants, 20 wt. % graphite (in 27 wt. % $H_2O$), total water 33 wt. % from both the activator solution and graphite slurry. The viscosity was 600 cps.

The MTCR paint was applied to polyester strips having conductive strips attached thereto in accordance with the previously described method. The MTCR strips (2"×7½") were attached to a 112 $in^2$ aluminum pan with silicon adhesive tape. The conductive metal strips of the MTCR articles were connected to a 120 volt AC power source. After 10 minutes, the MTCR strips attained a temperature of 190° F. and the water in the pan was heated to 160° F. The water temperature was maintained without a thermostat.

As a result, a constant heat was generated by applying the fabricated heating tape which was prepared in accordance with the present invention.

Although illustrative embodiments of the present invention have been described herein with reference to the accompany drawings, it is to be understood that the invention is not limited to the precise embodiment, and that various other changes and modifications may be effected therein by one skilled in the art without departing from the scope or spirit of the invention.

What is claimed is:

1. An electrical resistant temperature adjustable article, which comprises:

a first substrate; and a medium temperature conductive-resistive coating applied to said substrate, said medium temperature conductive-resistive coating comprising 10–30 weight percent graphite having a particle size from about 150 to about 325 mesh, 20–65 weight percent polymer latex and 6 to 60 weight percent total water based on 100 weight percent total composition;

wherein said article is capable of having its temperature adjusted between ambient temperature and 400° F.

2. An electrical-resistant temperature-adjustable article as defined by claim 1 wherein said first substrate is a textile material.

3. An electrical-resistant temperature-adjustable article as defined by claim 1 wherein said first substrate is hydrophilic in nature.

4. An electrical-resistant temperature-adjustable article as defined by claim 1 wherein the first substrate is treated with a hydrophilic substance before the conductive resistive coating is applied, the hydrophilic substance causing the first substrate to be hydrophilic.

5. An electrical-resistant temperature-adjustable article as defined by claim 1 wherein the first substrate remains pliable after the conductive-resistive coating has been applied thereto.

6. An electrical-resistant temperature-adjustable article as defined by claim 1 further comprising spaced-apart electrical conductors secured with an adhesive to said medium temperature conductive-resistive coating for electrical conductance between said electrical conductors.

7. An electrical-resistant temperature-adjustable article as defined by claim 1 further comprising spaced-apart electrical conductors secured to said first substrate.

8. An electrical-resistant temperature-adjustable article as defined by claim 7 wherein said spaced-apart electrical conductors are interposed between said first substrate and said medium temperature conductive-resistive coating for electrical conductance between said electrical conductors.

9. An electrical-resistant temperature-adjustable article as defined by claim 7 further comprising:

a power source coupled to said spaced-apart electrical conductors;

wherein when said power source is activated, electrical current flows between the spaced-apart electrical conductors through the medium temperature conductive-resistive coating, whereby heat is generated as a result of the electrical current flow.

10. An electrical-resistant temperature-adjustable article as defined by claim 9 wherein the power source is a battery.

11. An electrical-resistant temperature-adjustable article as defined by claim 7 which further comprises a second substrate positioned substantially coextensively with and in parallel relation to said first substrate whereby said spaced-apart electrical conductors and said conductive-resistive coating are between said first and second substrates and said second substrate adheres to said conductive-resistive coating.

12. An electrical-resistant temperature-adjustable article as defined by claim 11 wherein said second substrate is a textile material.

13. An electrical-resistant temperature-adjustable article as defined by claim 1 wherein said conductive-resistive coating comprises graphite suspended in a polymer latex binder in an amount sufficient to provide controllable conductivity and resistance for said temperature variance of the substrate.

14. A method of providing temperature-adjustment capability to a substrate comprising applying a coating of a medium temperature conductive-resistive substance to said substrate, said medium-temperature conductive-resistive substance comprising 10–30 weight percent graphite having a particle size from about 150 to about 325 mesh, 20–65 weight percent polymer latex and 6 to 60 weight percent total water based on 100 weight percent total composition, wherein said article is capable of temperature adjustment between ambient temperature and 400° F.

15. A method of providing temperature-adjustment capability to a substrate as defined by claim 14 wherein said substrate is a textile material.

16. A method of providing temperature-adjustment capability to a substrate as defined by claim 14, wherein a hydrophilic substance is interposed between said substrate and said medium temperature conductive-resistive substance.

17. A method of providing temperature-adjustment capability to a substrate as defined by claim 14 wherein spaced-apart electrical conductors are interposed between said substrate and said medium temperature conductive-resistive substance.

18. A method of providing temperature-adjustment capability to a substrate as defined by claim 14 further comprising securing spaced-apart electrical conductors to said substrate.

19. A method of providing temperature adjustment capability to a substrate as defined by claim 14 further comprising securing spaced-apart electrical conductors to said medium temperature conductive-resistive substance.

20. A method of providing temperature-adjustment capability to a substrate as defined by claim 14 further comprising:

electrically coupling a power source to said medium temperature conductive-resistive substance so as to provide current flow through the medium temperature conductive-resistive substance in order to vary the temperature of the substrate.

21. A method of providing temperature-adjustment capability to a substrate as defined by claim 14 further comprising:

applying a second substrate to the medium temperature conductive-resistive substance so that the medium temperature conductive-resistive coating is between the substrate and the second substrate and said second substrate adheres to the conductive-resistive substance.

* * * * *